US006601761B1

(12) United States Patent
Katis

(10) Patent No.: US 6,601,761 B1
(45) Date of Patent: Aug. 5, 2003

(54) METHOD AND SYSTEM FOR CO-BRANDING AN ELECTRONIC PAYMENT PLATFORM SUCH AS AN ELECTRONIC WALLET

(75) Inventor: Thomas Katis, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 09/396,242

(22) Filed: Sep. 15, 1999

(Under 37 CFR 1.47)

Related U.S. Application Data

(60) Provisional application No. 60/126,524, filed on Mar. 26, 1999, and provisional application No. 60/100,408, filed on Sep. 15, 1998.

(51) Int. Cl.[7] .............................................. G06F 17/60
(52) U.S. Cl. ......................... 235/379; 235/380; 705/26
(58) Field of Search ................... 235/375, 379, 235/380, 381, 382, 382.5, 492; 705/2, 9, 10, 14, 26, 40

(56) References Cited

U.S. PATENT DOCUMENTS

| 4,906,826 A | | 3/1990 | Spencer ....................... 235/379 |
| 5,025,372 A | | 6/1991 | Burton et al. ................ 364/406 |
| 5,056,019 A | | 10/1991 | Schultz et al. ............... 364/405 |
| 5,297,026 A | | 3/1994 | Hoffman ...................... 364/408 |
| 5,438,184 A | | 8/1995 | Roberts et al. .............. 235/380 |
| 5,483,444 A | | 1/1996 | Heintzeman et al. ........ 364/401 |
| 5,513,102 A | | 4/1996 | Auriemma .................... 364/408 |
| 5,537,314 A | | 7/1996 | Kanter ......................... 364/406 |
| 5,557,518 A | | 9/1996 | Rosen .......................... 364/408 |
| 5,590,197 A | | 12/1996 | Chen et al. .................... 380/24 |
| 5,606,361 A | * | 2/1997 | Davidsohn et al. ........ 348/14.01 |
| 5,621,797 A | | 4/1997 | Rosen .......................... 380/24 |
| 5,671,280 A | | 9/1997 | Rosen .......................... 380/24 |
| 5,687,322 A | | 11/1997 | Deaton et al. ............... 395/214 |
| 5,691,232 A | | 11/1997 | Bashir et al. ................. 437/67 |
| 5,692,132 A | | 11/1997 | Hogan ......................... 395/227 |

(List continued on next page.)

OTHER PUBLICATIONS

"Yahoo ! Unveils Platinum Visa Card", Yahoo! Media Relations, Feb. 23, 1998.*
"Canada Online", CardTrak Online, Oct. 22, 1999.*
"Sony Citibank Card", CardTrak Online, Sep. 25, 1998.*
"Crown Central, First Omni Bank Co–Branded Credit Card Launched", CardTrak Online, May, 14, 1996.*
"KDD/ To Issue Co–Branded KDD–Credit Cards", CartTrak Online, May 28, 1996.*
"Edupage Summary", Edupage, Jul. 31, 1997.*
"Smart Card Banking System: E. Wallet & Loyalty Applications" [online], [retrieved on Jul. 9, 1998], 2 pp., Retrieved from the Internet: http://www.tkdgroup.com/Ewallet.htm.

Primary Examiner—Thien M. Le
(74) Attorney, Agent, or Firm—George T. Marcou; Kilpatrick Stockton LLP

(57) ABSTRACT

A method and system of co-branding an electronic payment platform, such as an electronic wallet, makes use of computer hardware and software including, for example, one or more electronic wallet related servers controlled by a financial institution, which can be coupled over the Internet to a user's personal computer and merchant's website server. The electronic wallet is co-branded, for example, with the brand of the financial institution and the brand or brands of one or more cooperating merchants. The co-branded electronic payment platform makes use of a payment mechanism related, for example, to a credit card account of the user or digital payment tokens pre-allocated for the user. The user is given an incentive award for use of the co-branded electronic payment platform which is stored for the user and redeemable on one or more of the cooperating merchants.

26 Claims, 6 Drawing Sheets

U.S. PATENT DOCUMENTS

| | | | |
|---|---|---|---|
| 5,692,827 A | 12/1997 | Chinniah et al. | 362/336 |
| 5,708,782 A | 1/1998 | Larson et al. | 395/214 |
| 5,734,838 A | 3/1998 | Robinson et al. | 395/214 |
| 5,748,737 A | 5/1998 | Daggar | 380/24 |
| 5,757,917 A | 5/1998 | Rose et al. | 380/25 |
| 5,768,385 A | 6/1998 | Simon | 380/24 |
| 5,774,870 A | 6/1998 | Storey | 705/14 |
| 5,794,874 A | 8/1998 | Setsumasa et al. | 242/346.1 |
| 5,826,241 A | 10/1998 | Stein et al. | 705/26 |
| 5,901,303 A * | 5/1999 | Chew | 2355/492 |
| 5,945,653 A * | 8/1999 | Walker et al. | 235/380 |
| 6,014,635 A * | 1/2000 | Harris et al. | 705/14 |
| 6,208,973 B1 * | 3/2001 | Boyer et al. | 705/2 |
| 6,266,648 B1 * | 7/2001 | Baker, III | 705/14 |
| 6,325,284 B1 * | 12/2001 | Walker et al. | 235/380 |
| 6,325,292 B1 * | 12/2001 | Sehr | 235/375 |
| 6,332,126 B1 * | 12/2001 | Peirce et al. | 705/14 |
| 6,345,261 B1 * | 2/2002 | Feidelson et al. | 705/14 |
| 6,386,451 B1 * | 5/2002 | Sehr | 235/384 |
| 2002/0046341 A1 * | 2/2001 | Kazaks et al. | 713/182 |
| 2002/0010584 A1 * | 5/2001 | Schultz et al. | 704/270 |
| 2002/0062249 A1 * | 8/2001 | Iannacci | 705/14 |

\* cited by examiner

REWARDS

BANK

To Earn Rewards, simply provide us with the following information so that we can open an account for you. Your privacy and security are guaranteed by Bank.

Just choose user ID, password, and enter your e-mail address below:

50
User ID [        ]    54
              Password [        ]

52
E-mail [        ]    Password [        ]
                     (enter twice to verify)

We require your e-mail address for security purposes only. Bank will not release your e-mail address for any reason unless you authorize us to do so by checking here. ☒

○ Help ( Add/Change )    ( Cancel )    ( Continue )

METHOD AND SYSTEM FOR CO-BRANDING AN ELECTRONIC PAYMENT PLATFORM SUCH AS AN ELECTRONIC WALLET

CROSS REFERENCE TO RELATED APPLICATION

This application claims the benefit of U.S. Provisional Application No. 60/100,408 filed Sep. 15, 1998 and U.S. Provisional Application No. 60/126,524 filed Mar. 26, 1999.

FIELD OF THE INVENTION

The present invention relates generally to a method and system of co-branding an electronic payment system and more particularly to a method and system for co-branding an on-line electronic payment platform, such as an electronic purse or wallet.

BACKGROUND

Currently, financial institutions, such as banks, issue plastic credit cards to card holders which are branded with the financial institution's brand name as well as co-branded with the brand name of a merchant, such as an airline. Typically, such co-branded credit cards are issued in connection with an incentive awards program sponsored in whole or in part by the merchant. For example, each use of the credit card by the card holder for a transaction entitles the card holder to receive an incentive award corresponding to the value of the transaction in which the credit card is used.

A card holder may receive, for example, a number of frequent flyer miles in an airline's frequent flyer program equivalent to the dollar amount of each transaction in which the credit card is used by the card holder. The card holder receives periodic invoices from the financial institution for the credit card transactions and periodic reports from the airline of accumulated frequent flyer miles, including actual miles flown and credit card transaction awards.

Presently, such systems are limited to physical payment systems in which plastic credit cards are used and have no application to electronic commerce in which an electronic payment mechanism, such as an electronic purse or wallet, is used for payment in a transaction in an on-line environment. Electronic wallets can have varying modes of operation. An electronic wallet can be located, for example, at a merchant's site, or can be merchant-oriented and be located, for example, at a third party's site. A single electronic wallet can be used for several merchants, or separate electronic wallets can be provided for each merchant that use common software to carry out the wallets' functions. Electronic wallets can be consumer oriented and used by the consumer to pay for goods or services at various merchants' sites.

In a typical web-based transaction, a consumer at the consumer's personal computer (PC), uses the consumer's PC browser to access a merchant's website. The consumer selects goods or services that the consumer wishes to purchase, and the merchant may provide the consumer with an order or payment form to fill out, which asks for payment information, such as a credit card number, expiration date, and shipping information. Typically, the consumer types in the information needed by the merchant each time the consumer wishes to place an order. An electronic wallet enables the user to avoid typing in such information over and over again by storing the consumer's information, such as the consumer's credit card information and preferred shipping information in the electronic wallet.

However, the co-branding and incentive award aspects of plastic credit cards are presently limited to physical payment systems and have no application to electronic payment systems in which credit card information is stored for the consumer in the electronic wallet.

SUMMARY OF THE INVENTION

It is a feature and advantage of the present invention to provide a method and system for co-branding an on-line electronic payment platform, such as an electronic wallet, owned and controlled by a financial institution, such as a bank, which enables the financial institution to promote the co-branded electronic wallet with the brands of the financial institution, as well as the brands of any number of cooperating merchants.

It is a further feature and advantage of the present invention to provide a method and system for co-branding an electronic wallet which is owned and controlled in part by the financial institution and one or more cooperating merchants.

It is another feature and advantage of the present invention to provide a method and system for co-branding an electronic wallet, which enables the financial institution to control accounts, linkages to accounts, and credit cards or other payment vehicles that are put into the co-branded electronic wallet.

It is an additional feature and advantage of the present invention to provide a method and system for co-branding an electronic wallet for use in an on-line or Internet payment system, which makes use, for example, of a digital bearer certificate architecture.

It is also a feature and advantage of the present invention to provide a method and system for co-branding an electronic wallet for use in a network based environment in which all the functionality of the electronic resides on a financial institution server.

It is a still further feature and advantage of the present invention to provide a method and system for co-branding an electronic wallet in which the electronic payment system is transparent or seamless to a consumer.

It is still another feature and advantage of the present invention to provide a method and system for co-branding an electronic wallet which provides incentive or award points to the consumer for each use of the electronic wallet.

It is a further feature and advantage of the present invention to provide a method and system for co-branding an electronic wallet which provides incentive or award points to the consumer that are funded by one or more cooperating merchants.

It is an additional feature and advantage of the present invention to provide a method and system for co-branding an electronic wallet which gives the consumer an option to make payments using a payment instrument, such as the consumer's credit card, stored in the electronic wallet or by redeeming the consumer's incentive or award points.

To achieve the stated and other features, advantages and objects, an embodiment of the method and system for co-branding an electronic wallet of the present invention makes use of computer hardware and software, such as merchant and consumer scale group servers, the consumer's PC, and a merchant's website server coupled to one another over the Internet, as well as a rewards database coupled to a rewards merchant interface of the merchant scale group server and to a rewards account feed of the consumer scale group server.

Another aspect for an embodiment of the method and system for co-branding an electronic wallet of the present invention also makes use of computer hardware and software, such as the merchant and consumer scale group servers, the consumer's PC, and merchant's website server coupled over the Internet, as well as electronic cash and rewards merchant modules, coupled to the merchant scale group server and to an electronic cash token clearing house, and an electronic cash purse server and rewards point server coupled to the consumer scale group server.

The method and system for an embodiment of the present invention includes, for example, providing an on-line access for a user, such as the consumer, to the electronic payment platform co-branded by the financial institution, such as the bank, and at least one or any number of additional cooperating merchants or partners. The co-branded electronic payment platform is used by the user for making a payment, in connection with which the user is given an incentive award which is automatically stored for the user and which the user is then allowed to redeem.

An embodiment of the present invention includes, for example, providing the on-line access to a co-branded Internet payment system in which payment information is stored for the user, for example, on a wallet server. The stored payment information relates to an account of the user, such as a credit card account, a debit card account, a checking account, or a savings account. An aspect the co-branded electronic payment platform includes, for example, a digital bearer certificate payment system. In the digital bearer certificate aspect, digital payment tokens are stored for the user, for example, on an electronic cash purse server. In this aspect, the digital payment tokens are pre-allocated from an account of the user, such as the user's credit card, debit card, checking, or savings account.

The co-branded electronic payment platform for an embodiment of the present invention is controlled at least in part by the financial institution, with the financial institution controlling, for example, one or more of accounts, linkages to accounts, and payment instruments. In an aspect of an embodiment of the present invention, the co-branded electronic payment platform is also controlled in part by one or more of the cooperating merchants. In such aspect, one or more of the cooperating merchants can control, for example, a link to the cooperating merchant's website or award point database.

In an embodiment of the present invention, a co-branded electronic wallet application for the co-branded electronic payment platform resides on a wallet server of the financial institution or a wallet server provided for the financial institution by another party. The wallet server stores the user's payment information, such as the payment information related to the user's credit card, debit card, checking or savings account. In the digital bearer certificate aspect, an electronic cash purse server of the wallet server stores the digital payment tokens for the user pre-allocated from the user's credit card, debit card, checking or savings account.

In order to make a payment using the co-branded electronic payment platform for an embodiment of the present invention, the user invokes the co-branded electronic wallet application, and a co-branded electronic wallet window is displayed for the user by the wallet server. The user enters a selection to make the payment with the user's payment information stored by the wallet server, and the wallet server automatically sends the user's payment information to a merchant's website server for the user. The payment information sent by the wallet serve includes, for example, the user's stored credit card, debit card, checking, or savings account related information or the stored digital payment tokens pre-allocated for the user from the user's credit card, debit card, checking, or savings account.

In an embodiment of the present invention, for each use of the co-branded electronic payment platform, an incentive award, such as reward points, is stored for the user in a rewards database or by a rewards points server of the wallet server. The incentive award is calculated, for example, on the amount of the payment made by the user and is sponsored by one or more of the cooperating merchants or by one or more of the cooperating merchants together with the financial institution.

An embodiment of the co-branded electronic payment platform of the present invention also includes allowing the user to redeem the stored incentive award. In order to redeem the incentive award, the user invokes the co-branded electronic wallet application of the wallet server, and the co-branded wallet window is displayed for the user by the wallet server. The co-branded wallet window displays an option for the user to redeem the stored incentive award, for example, by making the payment to a merchant's website server. The user can then redeem the stored incentive award by entering a selection to make the payment from the stored incentive award.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 4 shows a sample sign up window for an incentive award points aspect of the co-branded electronic wallet for an embodiment of the present invention;

DETAILED DESCRIPTION

Figure 1:
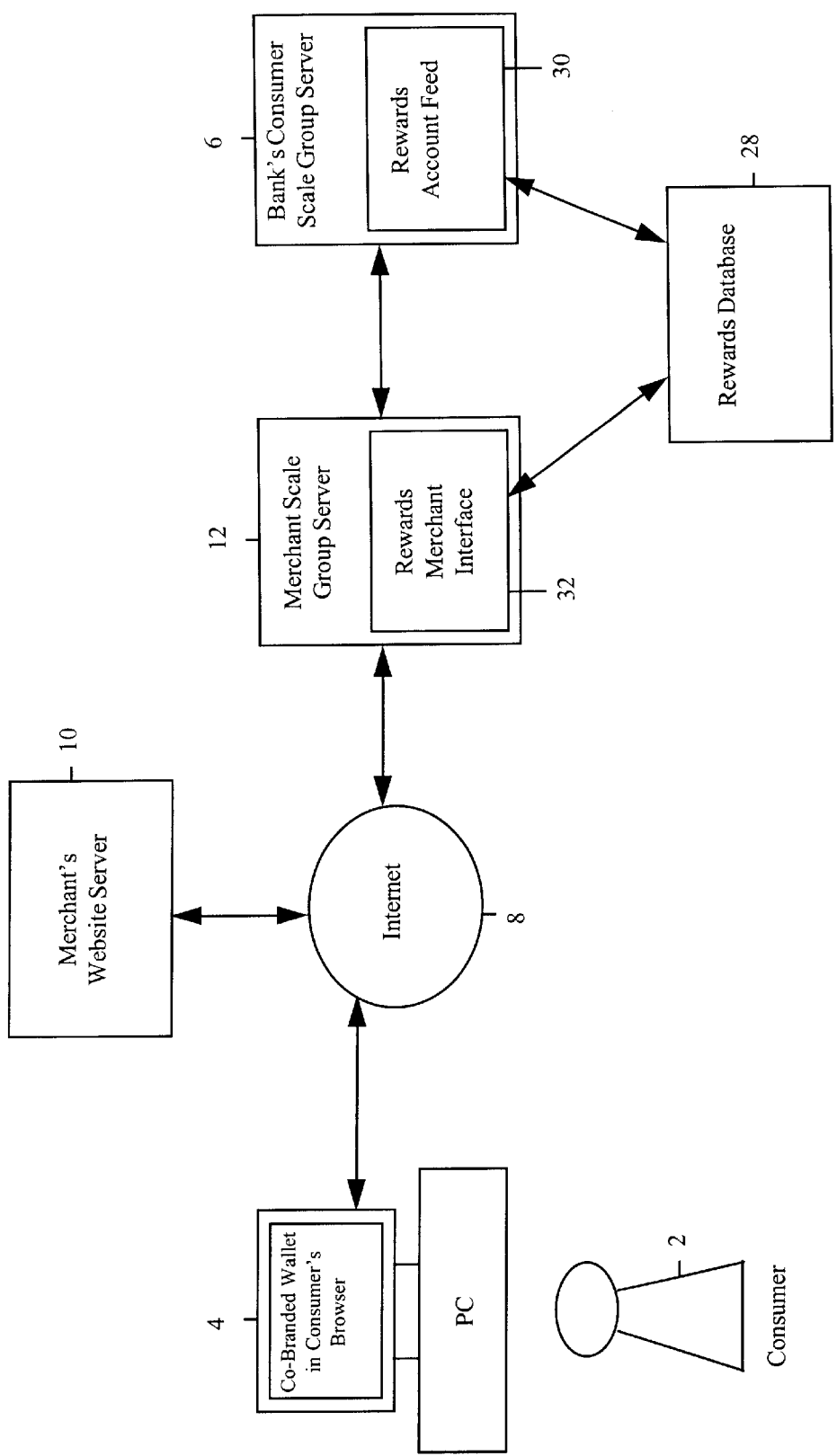
FIG. 1 is a schematic diagram which shows an overview of key components and the flow of information between the key components for an example of an electronic payment platform for use of the co-branded electronic wallet for an embodiment of the present invention.

Referring now in detail to an embodiment of the present invention, an example of which is illustrated in the accompanying drawings, FIG. 1 is a schematic diagram which shows an overview of key components and the flow of information between the key components of an example of an electronic payment platform for use of the co-branded electronic wallet for an embodiment of the present invention. In an embodiment of the present invention, the electronic wallet is co-branded by putting the brand of a financial institution, such as a bank, as well as the brand or brands of one or more cooperating merchants or partners, on the electronic wallet.

In one aspect of the co-branded electronic wallet for an embodiment of the present invention, the financial institution and the cooperating merchant or merchants co-brand the electronic wallet, and the financial institution controls the actual accounts, linkages to accounts, and the credit cards, debit cards or any other payment instruments, such as checking accounts or savings accounts, that are put into the electronic wallet.

In another aspect of the co-branded electronic wallet for an embodiment of the present invention, the electronic payment vehicle is provided for the consumer 2 by the financial institution, such as the bank, and is owned and controlled in part by the financial institution and in part by one or more participating or cooperating merchants. This aspect provides basically for dual or multiple ownership of the electronic payment platform. The financial institution and the cooperating merchant or merchants co-brand the electronic payment platform, and control of certain aspects of the co-branded electronic wallet are given over to one or more of the cooperating merchants, along with the financial institution.

In the dual or multiple ownership aspect of an embodiment of the present invention, the financial institution controls the actual accounts, linkages to accounts, and the credit cards or any other payment instruments that are put into the electronic wallet, and the cooperating merchant or merchants control some other functionality of the electronic wallet, such as links to their websites or award points. In this aspect, a cooperating merchant, such as an airline, can show a consumer's balance of frequent flyer miles or the balance of other award points. Further control given over to the co-branding merchant or merchants includes, for example, use of some other functionality within the electronic wallet, such as search, or channels or links to other areas of the co-branding merchant's or merchants' websites.

Another aspect of an embodiment of the co-branded electronic wallet of the present invention is use of the co-branded electronic wallet in an on-line or Internet payment system, in which the core of the actual value transfer system is a digital bearer certificate architecture. The way in which the digital bearer certificate system works is essentially to pre-allocate value. Whether the pre-allocated value is in the form of electronic cash or credit, or anything else, the consumer 2 is given digitally equipped tokens in the co-branded electronic wallet.

In the digital bearer certificate aspect of the co-branded electronic wallet for an embodiment of the present invention, the consumer 2 at the consumer's personal computer (PC) 4 pays for goods or services with the digitally equipped tokens stored in the co-branded electronic wallet. Instead of checking to confirm whether or not there is money in the consumer's account or credit on the consumer's credit line at the time of a transaction, it is done prior to the time of the transaction. Only the authenticity of the tokens is checked at the time of the purchase.

In an embodiment of the present invention, the electronic payment system for use of the co-branded electronic wallet is in a network based environment. The environment in which the tokens are used and all the functionality of the co-branded electronic wallet reside on a server 6 which is run by the financial institution, such as the bank, or by someone else with whom the bank contracts. It is not necessary for the consumer 2 to download a software wallet and install it on the consumer's PC 4 and then store tokens on the hard drive of the consumer's PC 4. Generally, all accounts and functionalities and tokens reside on the bank's server 6, which the consumer 2 can access from anywhere on the Internet 8.

Referring to FIG. 1, the co-branded network based electronic wallet for an embodiment of the present invention is a portal from the financial institution's wallet server 6 to the merchant's website server 10 through the financial institution's merchant group server 12. The co-branded electronic wallet is served up on the browser of the consumer's PC 4 via JAVA or hypertext markup language (HTML) or any other standard Internet language. The co-branded electronic wallet runs to a separate application of the browser of the consumer's PC 4.

Figure 2:
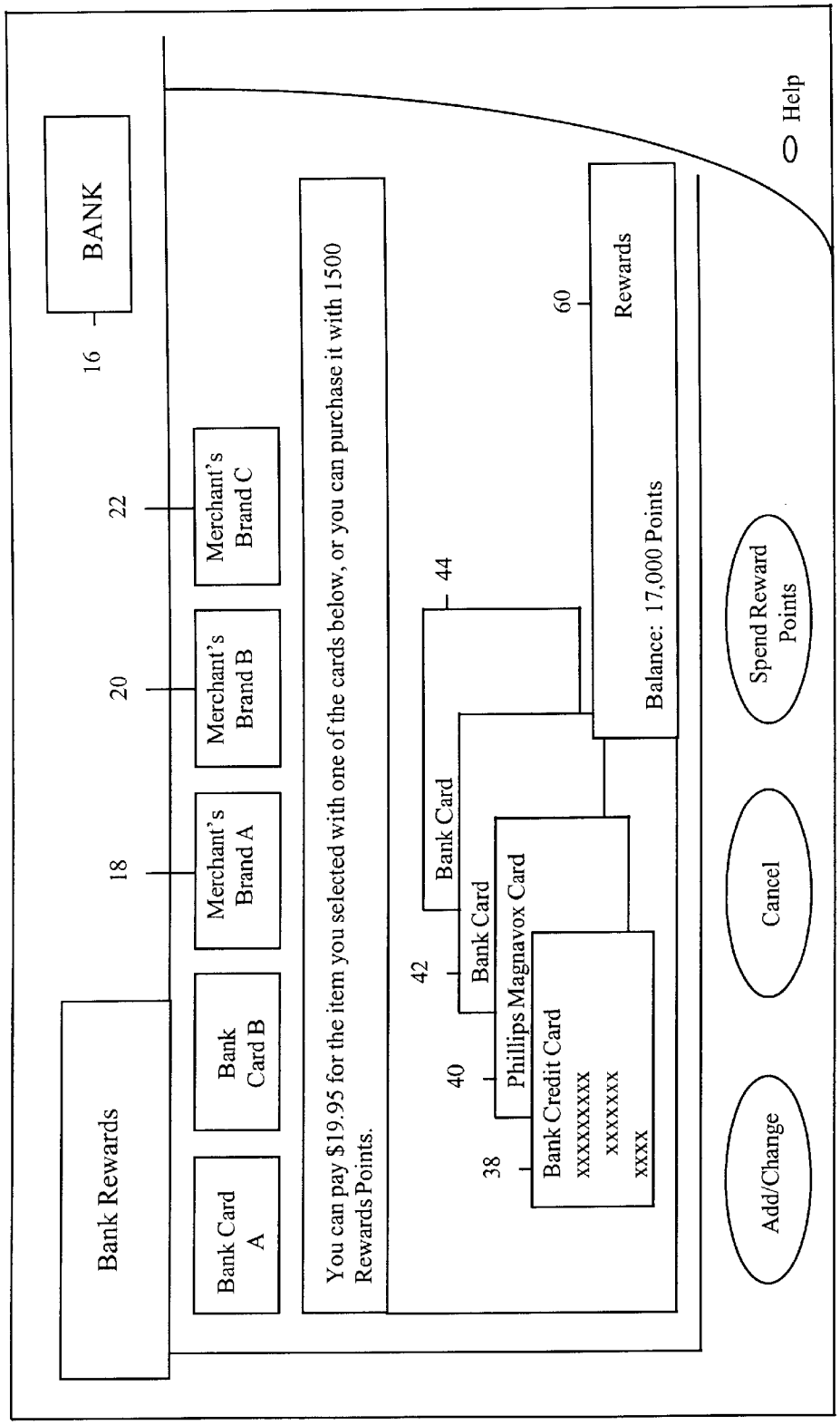
FIG. 2 shows an sample payment window for the co-branded electronic wallet for an embodiment of the present invention.

FIG. 2 shows a sample payment window for the co-branded electronic wallet for an embodiment of the present invention. The browser on the consumer's PC 4 essentially opens up a second window 14 on the consumer's PC 4 and serves up the co-branded electronic wallet outside the frame on the consumer's PC 4 in which the consumer is shopping. The co-branded electronic wallet can be served up directly within the browser itself on the consumer's PC 4 at the merchant's website, or at the financial institution's website, or at the website of a partner of the financial institution. The financial institution places the financial institution's brand 16, as well as at least one cooperating merchant's or partner's brand 18, or any number of additional cooperating merchants' or partners' brands 20, 22, on the financial institution's electronic wallet.

In an embodiment of the present invention, if the consumer 2 does not already have an account, a space is provided on the website for input of credit card information, name, address, and the like. The financial institution's website server 6 saves the information for the consumer 2, and subsequently the consumer 2 needs only to enter a password without re-entering the information. The co-branded electronic payment system is not a physical payment product, and there is no actual credit card. However, the consumer 2 can put a credit card in the co-branded electronic wallet by entering the credit card number in advance and then paying with the credit card by transferring the credit card number to the merchant's website server 10 via the co-branded electronic wallet securely over the Internet 8.

In the digital bearer certificate aspect for an embodiment of the present invention, the consumer 2 can load value from the credit card 38 and store the value in the form of tokens. The consumer 2 can load pre-allocated value in advance from the consumer's credit card 38, for example, to the financial institution's co-branded electronic cash purse wallet. Whether the pre-allocated value is in the form, for example, of electronic cash or credit, the consumer 2 is given digitally equipped tokens in the co-branded electronic wallet.

Figure 3:
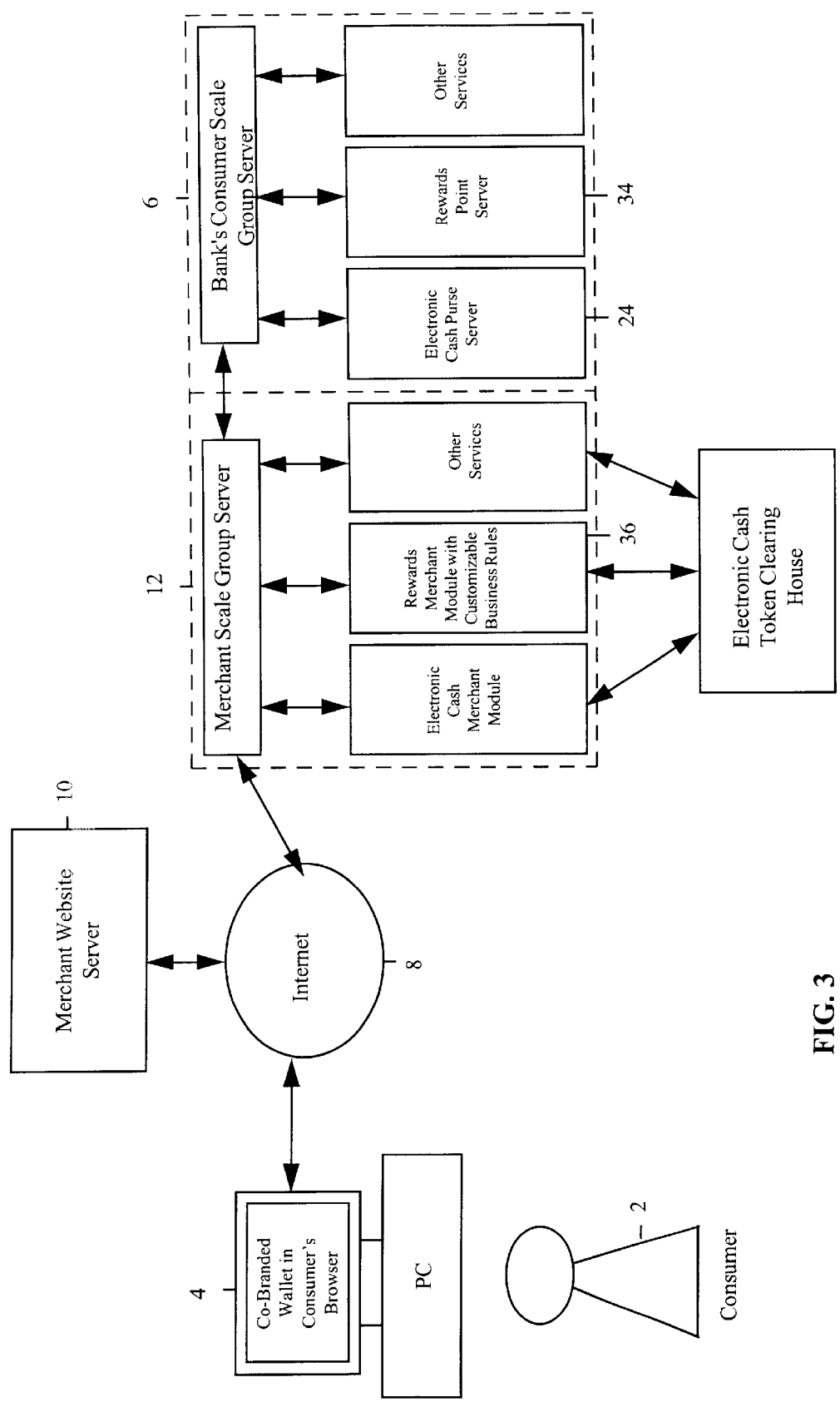
FIG. 3 is a schematic diagram which shows an overview of key components and the flow of information between the key components for an example of an electronic payment platform for a digital bearer certificate aspect of the co-branded electronic wallet for an embodiment of the present invention.

FIG. 3 is a schematic diagram which shows an overview of key components and the flow of information between the key components for an example of the electronic payment platform for the digital bearer certificate aspect of the co-branded electronic wallet for an embodiment of the present invention. Essentially, credit is extended to the consumer 2 in the form of tokens or by charging the consumer's credit card and storing electronic cash in the co-branded electronic wallet on the financial institution's electronic cash purse server 24, which can then be spent by the consumer 2 around the Internet 8.

In another aspect for an embodiment of the present invention, the co-branded electronic payment system can be transparent to the consumer 2. The consumer 2 can be offered the ability to put the consumer's credit card 38 in the co-branded electronic wallet and then have a separate electronic cash account stored on the financial institution's electronic cash purse server 24, so that the consumer 2 knows when electronic cash or tokens are being spent or whether the consumer's credit card 38 is being used. Further, the co-branded electronic payment system can be seamless to the consumer 2, such that the consumer 2 is unaware of which payment vehicle is being used, and the financial institution is authorized to decide which payment vehicle to use at the time payment is executed.

An additional aspect of the co-branded wallet for an embodiment of the present invention is providing incentive or award points or other types of value, such as frequent flyer miles, coupons, and the like, to the consumer 2 for use of the co-branded electronic wallet platform. In this aspect, award points are offered, for example, at top websites and funded by the cooperating merchants at no cost to the consumer 2, and are tailored to individual merchant offerings. In addition to cooperating airlines, other cooperating merchants can include, for example, merchants in the fields of music, books, computer software, miscellaneous merchandise, and the like.

In the incentive or award points aspect of the co-branded wallet for an embodiment of the present invention, the electronic payment platform makes use, for example, of a rewards database 28, a rewards account feed 30 of the financial institution's wallet server 6, and a rewards merchant interface 32 of the merchant scale group server 12 as shown in FIG. 1. Alternatively, in the incentive or award points aspect of the co-branded wallet, the electronic payment platform makes use, for example, of a rewards point server 34 of the financial institution's wallet server 6 and a rewards merchant module 36 of the merchant scale group server 12 as shown in FIG. 3.

In the incentive or award points aspect of the co-branded electronic wallet for an embodiment of the present invention, the consumer 2 is given incentive or rewards points or other types of value, such as frequent flyer miles, coupons and the like, for each use of the co-branded electronic wallet. The financial institution promotes its electronic payment platform with its incentive awards program to the consumer 2, and all participants use the financial institution's electronic wallet payment platform. The financial institution works with one or more third parties to migrate participants to the financial institution's electronic payment platform, and the financial institution also uses its incentive awards program to promote other financial institution products, such as its electronic commerce and banking products.

FIG. 4 shows a sample sign up window for the incentive or award points aspect of the co-branded electronic wallet for an embodiment of the present invention. In this aspect, the consumer 2 can sign up for an incentive or award points program by entering a user ID 50, a user e-mail address 52, and a user password 54 to open a reward point account with the financial institution. The wallet server 6 automatically stores incentive or award points for the consumer for each use of the co-branded electronic wallet, for example, in the rewards database 28 shown in FIG. 1 or the rewards points server 34 shown in FIG. 3.

Referring further to FIG. 4, the payment window 14 can be used by the consumer 2 to redeem incentive or award points using the co-branded electronic wallet for an embodiment of the present invention. In the incentive or award points aspect, the consumer 2 can make purchases and spend money with merchants around the Internet 8 using the financial institution's electronic payment vehicle and receive incentive award points for each transaction, which are accumulated and redeemed or spent in other electronic transactions. The incentive or award points aspect can relate, for example, to a frequent flyer incentive program in an exclusive arrangement with one or more cooperating airlines in which reward points or frequent flyer miles are given for each use of the co-branded electronic wallet and are redeemed on the cooperating airlines.

Figure 5:
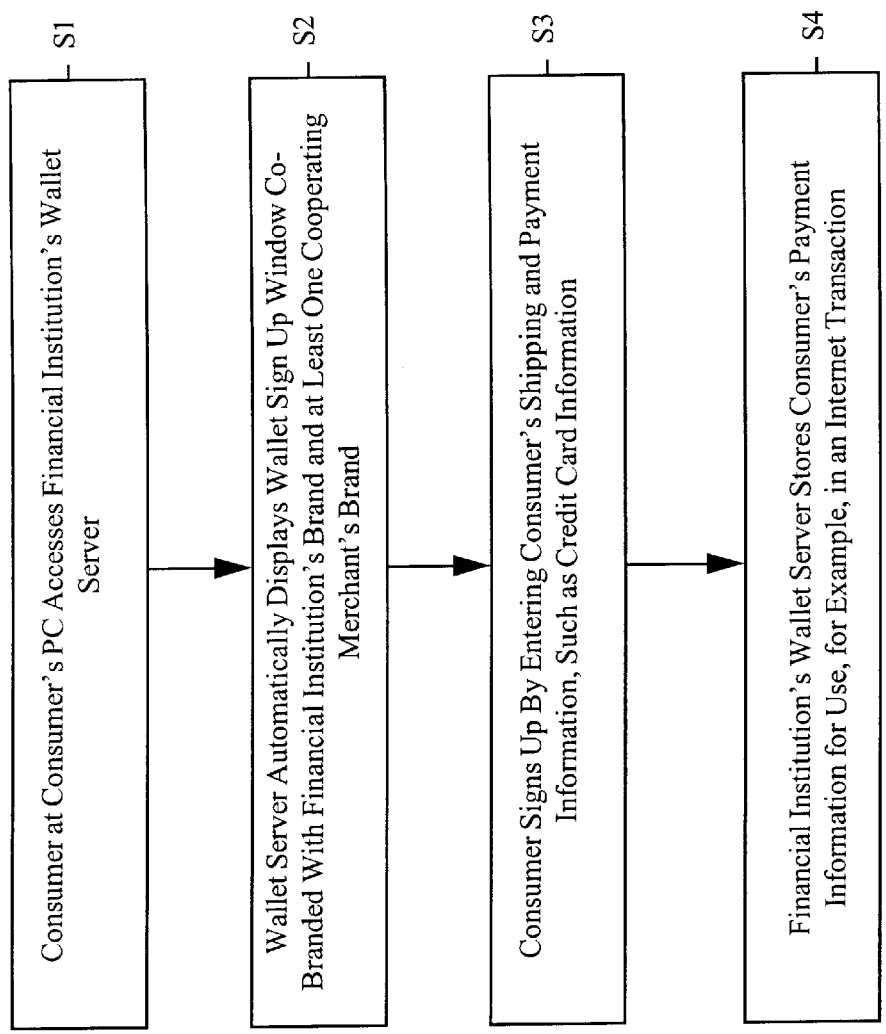
FIG. 5 is a flow chart which amplifies the flow of information shown in FIGS. 1 and 3 and provides further detail regarding an example of the process of a consumer putting a credit card in the co-branded electronic wallet for an embodiment of the present invention.

FIG. 5 is a flow chart which illustrates an example of the process of the consumer 2 putting a credit card in the co-branded electronic wallet for an embodiment of the present invention. Referring to FIG. 5, at S1, the consumer 2 at the consumer's PC 4 accesses the financial institution's wallet server 6, and at S2, the wallet server 6 serves up the electronic wallet on the browser of the consumer's PC 4, co-branded with the financial institution's brand 16, as well as at least one cooperating merchant's brand 18, or any number of additional cooperating merchants' brands 20, 22, as shown in FIG. 2.

Referring further to FIG. 5, at S3, the consumer 2 signs up by entering the consumer's preferred shipping and payment information, such as credit card, debit card information, or other account information, such as checking or savings account information. The credit card information can relate, for example, to a single credit card 38 or to a number of additional credit cards 40, 42, 42, as also shown in FIG. 2. At S4, the consumer's information is stored for the consumer 2 on the financial institution's wallet server 6. The consumer 2 is now able to use the consumer's credit card in the co-branded electronic wallet, for example, in a transaction with an Internet merchant.

Figure 6:
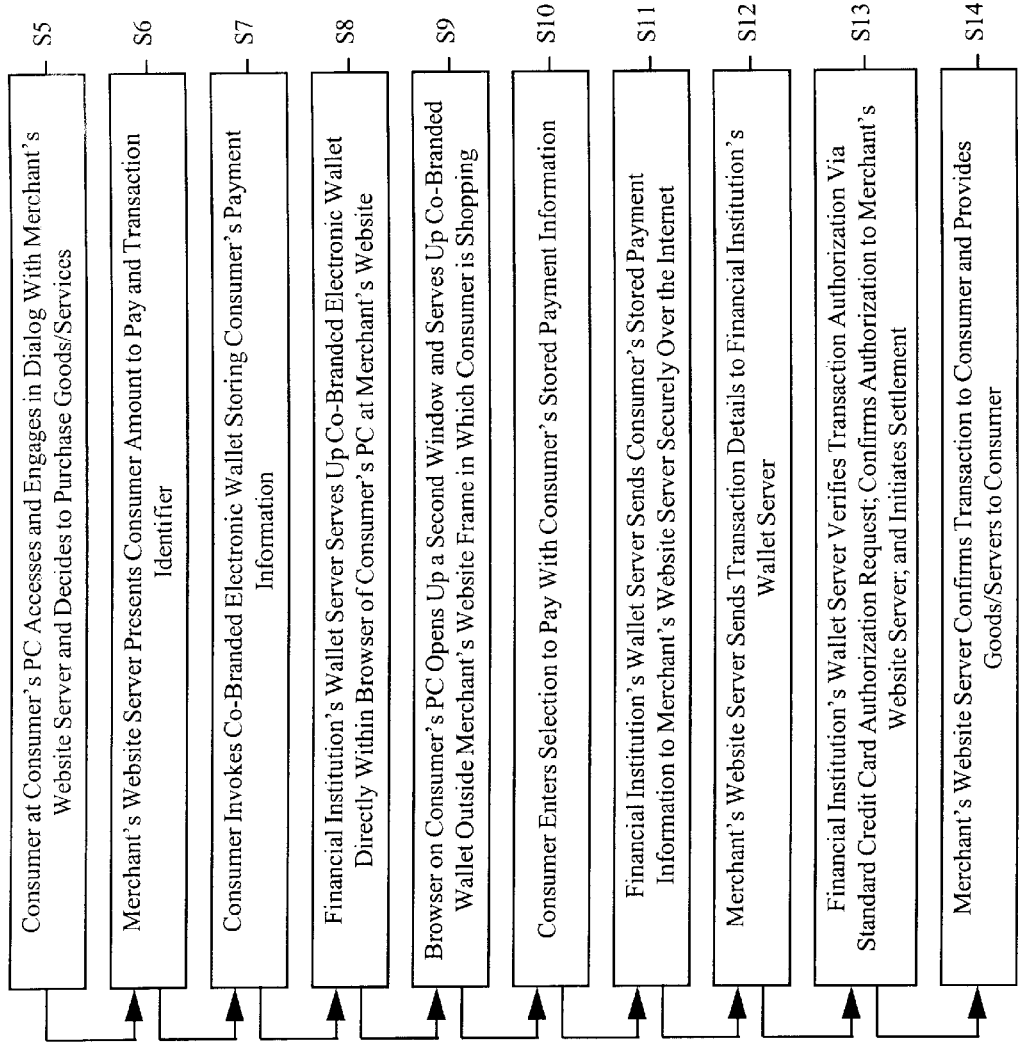
FIG. 6 is a flow chart which amplifies the flow of information shown in FIGS. 1 and 3 and provides further detail regarding an example of the process of the consumer's use of the credit card in the co-branded electronic wallet for an embodiment of the present invention.

FIG. 6 is a flow chart which illustrates an example of the process of the consumer's use of the consumer's credit card 38 in the co-branded electronic wallet for an embodiment of the present invention. Referring to FIG. 6, at S5, the consumer 2 at the consumer's PC 4 accesses and engages in a dialog with the merchant's website server 10 and decides to purchase goods or services. At S6, the merchant's website server 10 presents the consumer 2, for example, with an amount to pay and a transaction identifier. At S7, the consumer 2 invokes the co-branded electronic wallet storing the consumer's credit card information, and at S8, the financial institution's wallet server 6 serves up the electronic wallet directly within the browser of the consumer's PC 4, for example, at the merchant's website.

Referring further to FIG. 6, at S9, the browser on the consumer's PC 4 opens up a second window 14, as shown in FIG. 2, and serves up the co-branded electronic wallet outside the frame in which the consumer 2 is shopping. At S10, the consumer enters a selection to pay with one of the consumer's credit cards 38, and at S11, the consumer's stored credit card information is sent to the merchant's website server 10 via the co-branded electronic wallet securely over the Internet 8.

Referring again to FIG. 6, at S12, the merchant's website server 10 sends the transaction details to the bank's wallet server 6. At S13, the bank's wallet server 6 verifies authorization for the transaction with a standard credit card authorization request, for example, to a credit card authorization server, confirms the authorization to the merchant's website server 10 and initiates settlement. At S14, the merchant's website server 10 confirms the purchase to the consumer 2, and the merchant is ready to provide the goods or services according to the consumer's shipping information.

In the digital bearer certificate aspect of the co-branded electronic wallet for an embodiment of the present invention, when the consumer 2 invokes the co-branded electronic wallet, and the browser on the consumer's PC 4 opens up the window 14 and serves up the wallet outside the frame in which the consumer 2 is shopping, the consumer 2 is able to pay the merchant for the goods or services with the consumer's tokens stored in the electronic cash purse server 24 the co-branded electronic wallet. Instead of checking to confirm, for example, whether or not there is sufficient credit on the consumer's credit card account at the time of the transaction, it is done prior to the time of the transaction, and only the authenticity of the tokens is checked at the time of the purchase.

In the incentive or award points aspect of the co-branded electronic wallet for an embodiment of the present invention, when the consumer 2 invokes the co-branded electronic wallet, and the browser on the consumer's PC 4 opens up the window 14 and serves up the electronic wallet outside the frame in which the consumer 2 is shopping, the consumer 2 is offered an option of paying, for example, with the consumer's credit card 38 or by redeeming accumulated rewards points 60. The consumer 2 is able to select the redeeming accumulated rewards points option and pay the merchant for the goods or services with the consumer's rewards points stored in the rewards database 28 or the rewards point server 34 of the co-branded electronic wallet.

Another aspect of the co-branded electronic wallet for an embodiment of the present invention is use of digital bearer certificates of other types of non-cash value, such as electronic tickets, electronic coupons, on-line reward currencies, or electronic checks. A further aspect of the co-branded electronic wallet is use of digital bearer certificates to create a capital markets trading system. Capital markets rely on credit, which is historically checked after a trade is done, and if the credit is found to be bad after the trade, the trade is switched off with another entity. The digital bearer certificate pre-allocates credit, so that the credit check is done simultaneously with the trade.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of co-branding an electronic payment platform, comprising:
   providing an on-line access for a user to an electronic payment platform co-branded by a financial institution and at least one cooperating merchant;
   allowing the user to use the co-branded electronic payment platform for making a payment;
   automatically storing an incentive award for the user for the use of the electronic payment platform for making the payment; and
   allowing the user to redeem the stored incentive award;
   wherein providing the on-line access for the user to the electronic payment platform further comprises providing the on-line access to a digital bearer certificate payment system storing digital payment tokens for the user.

2. The method of claim 1, wherein providing the on-line access to the digital bearer certificate payment system storing digital payment tokens for the user further comprises providing the on-line access to the digital bearer certificate payment system storing digital payment tokens for the user on an electronic cash purse server.

3. The method of claim 2, wherein providing the on-line access to the digital bearer certificate payment system storing the digital payment tokens for the user on the electronic cash purse server further comprises storing value representing the digital tokens for the user on the electronic cash purse server pre-allocated from at least one user's account selected from a group of user's accounts consisting of a user's credit card account, a user's debit card account, a user's checking account, and a user's savings account.

4. The method of claim 1, wherein providing the on-line access for the user to the electronic payment platform further comprises providing the on-line access to the co-branded electronic payment platform controlled at least in part by the financial institution.

5. The method of claim 4, wherein providing the on-line access to the co-branded electronic payment platform controlled at least in part by the financial institution further comprises providing the on-line access to the electronic payment platform with at least one of accounts, linkages to accounts, and payment instruments controlled by the financial institution.

6. The method of claim 4, wherein providing the on-line access for the user to the electronic payment platform controlled at least in part by the financial institution further comprises providing the on-line access to the co-branded electronic payment platform controlled at least in part by the at least one cooperating merchant.

7. A method of co-branding an electronic payment platform, comprising:
   providing an on-line access for a user to an electronic payment platform co-branded by a financial institution and at least one cooperating merchant;
   allowing the user to use the co-branded electronic payment platform for making a payment;
   automatically storing an incentive award for the user for the use of the electronic payment platform for making the payment; and
   allowing the user to redeem the stored incentive award;
   wherein the co-branded electronic payment platform is controlled at least in part by the financial institution and in part by the at least one cooperating merchant; and
   wherein providing the on-line access to the co-branded electronic payment platform further comprises providing the on-line access to the electronic payment platform with at least one of a link to a website of the cooperating merchant and an award point database of the cooperating merchant controlled by the cooperating merchant.

8. The method of claim 7, wherein providing the on-line access for the user to the on-line electronic payment platform further comprises providing the on-line access for the user to an electronic wallet application on a wallet server controlled by one of the financial institution and another party for the financial institution.

9. The method of claim 7, wherein allowing the user to use the co-branded electronic payment platform for making the payment further comprises allowing the user to store payment information for the user in a wallet server of the co-branded electronic payment platform.

10. The method of claim 9, wherein allowing the user to store the payment information in the wallet server further comprises allowing the user to store the payment information in the wallet server related to at least one user's account selected from a group of user's accounts consisting of a user's credit card account, a user's debit card account, a user's checking account, and a user's savings account.

11. The method of claim 9, wherein allowing the user to store the payment information in the wallet server further comprises allowing the user to store digital tokens on an electronic cash purse server of the wallet server of the co-branded electronic payment platform pre-allocated from at least one user's account selected from a group of user's accounts consisting of a user's credit card account, a user's debit card account, a user's checking account, and a user's savings account.

12. The method of claim 7, wherein allowing the user to use the co-branded electronic payment platform for making the payment further comprises invoking a co-branded electronic wallet application of a wallet server by the user.

13. The method of claim 12, wherein invoking the co-branded electronic wallet application by the user further comprise automatically displaying a co-branded electronic wallet window for the user by the wallet server.

14. The method of claim 7, wherein allowing the user to use the co-branded electronic payment platform for making the payment further comprises entering a selection by the user to make the payment with payment information stored for the user by a wallet server.

15. The method of claim 14, wherein entering the selection by the user to make the payment with the stored payment information further comprises automatically sending the stored payment information to a merchant's website server for the user.

16. The method of claim 15, wherein automatically sending the stored payment information to the merchant's website server for the user further comprises automatically sending the stored payment information related to a least one user's account selected from a group of user's accounts consisting of a user's credit card account, a user's debit card account, a user's checking account, and a user's savings account.

17. The method of claim 15, wherein automatically sending the stored payment information to the merchant's website server for the user further comprises automatically sending stored digital payment tokens pre-allocated for the user from at least one user's account selected from a group of user's accounts consisting of a user's credit card account, a user's debit card account, a user's checking account, and a user's savings account.

18. The method of claim 7, wherein automatically storing the incentive award for the user further comprises automatically storing reward points for the user in a rewards database of a wallet server.

19. The method of claim 7, wherein automatically storing the incentive award for the user further comprises automatically storing reward points for the user in a rewards point server of a wallet server.

20. The method of claim 7, wherein automatically storing the incentive award for the user further comprises automatically storing the incentive award calculated on an amount of the payment.

21. The method of claim 7, wherein automatically storing the incentive award for the user further comprises automatically storing the incentive award sponsored by the at least one cooperating merchant.

22. The method of claim 7, wherein automatically storing the incentive award for the user further comprises automatically storing the incentive award sponsored at least in part by the at least one cooperating merchant and at least in part by the financial institution.

23. The method of claim 7, wherein allowing the user to redeem the stored incentive award further comprises invoking a co-branded electronic wallet application of a wallet server by the user.

24. The method of claim 23, wherein invoking the co-branded electronic wallet application by the user further comprises automatically displaying a co-branded wallet window for the user by the wallet server.

25. The method of claim 24, wherein automatically displaying the co-branded wallet window further comprises automatically displaying an option on the co-branded wallet window for the user to make the payment from the stored incentive award.

26. The method of claim 25, wherein allowing the user to redeem the stored incentive award further comprises entering a selection by the user for the option for making the payment from the stored incentive award.

* * * * *